US010623299B2

(12) United States Patent
Bottorff

(10) Patent No.: US 10,623,299 B2
(45) Date of Patent: Apr. 14, 2020

(54) REDUCED TOPOLOGIES

(71) Applicant: Hewlett Packard Enterprise Development LP, Houston, TX (US)

(72) Inventor: Paul Allen Bottorff, Portola Valley, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/965,884

(22) Filed: Apr. 28, 2018

(65) Prior Publication Data

US 2019/0334809 A1 Oct. 31, 2019

(51) Int. Cl.
*H04L 12/755* (2013.01)
*H04L 29/06* (2006.01)
*H04L 12/24* (2006.01)
*H04L 12/741* (2013.01)

(52) U.S. Cl.
CPC ............ *H04L 45/021* (2013.01); *H04L 41/12* (2013.01); *H04L 63/0892* (2013.01); *H04L 45/74* (2013.01)

(58) Field of Classification Search
CPC ... H04L 45/021; H04L 63/0892; H04L 41/12; H04L 45/74
See application file for complete search history.

(56) References Cited

U.S. PATENT DOCUMENTS

| 7,792,113 | B1 | 9/2010 | Foschiano et al. |
| 9,781,004 | B2 | 10/2017 | Danait et al. |
| 2005/0114551 | A1* | 5/2005 | Basu ............... G01S 5/0289 709/249 |
| 2006/0290697 | A1* | 12/2006 | Madden ............. G06T 11/206 345/440 |
| 2016/0112270 | A1* | 4/2016 | Danait .............. H04L 41/142 709/220 |
| 2017/0317901 | A1 | 11/2017 | Agrawal et al. |
| 2017/0339188 | A1 | 11/2017 | Jain et al. |
| 2019/0158407 | A1* | 5/2019 | Chanda ............... H04L 47/20 |

FOREIGN PATENT DOCUMENTS

WO    WO-2016186605    11/2016

OTHER PUBLICATIONS

Cisco, Cisco TrustSec Software-Defined Segmentation, (Research Paper), Retrieved Dec. 12, 2017, 2 Pgs.

* cited by examiner

*Primary Examiner* — Omar J Ghowrwal
(74) *Attorney, Agent, or Firm* — Hewlett Packard Enterprise Patent Department

(57) ABSTRACT

Examples include receiving a rule for communication between a first group and a second group of endpoints in a network. The network may include a plurality of networking devices. Examples include receiving a first identifier for the first group and a second identifier and a network address for the second group, receiving composition data of the network. Examples also include determining a topology of the network comprising a first number of communication paths and determining a reduced topology based on the rule, the first identifier, and the second identifier. The first number of paths may link a first networking device out of the plurality of networking devices to each device of the plurality of the networking devices. The second number of paths may link the first networking device to the second group.

20 Claims, 6 Drawing Sheets

REDUCED TOPOLOGIES

BACKGROUND

A network may include multiple endpoints attached to switches. The endpoints may communicate to each other in a variety of ways using switching devices to relay the message across the network. For example, a wireless controller may be able to receive and transmit messages to a wireless access point, but the wireless controller does not receive and/or receive messages from a wired controller.

BRIEF DESCRIPTION OF THE DRAWINGS

The following detailed description references the drawings, wherein.

DETAILED DESCRIPTION

Figure 1:
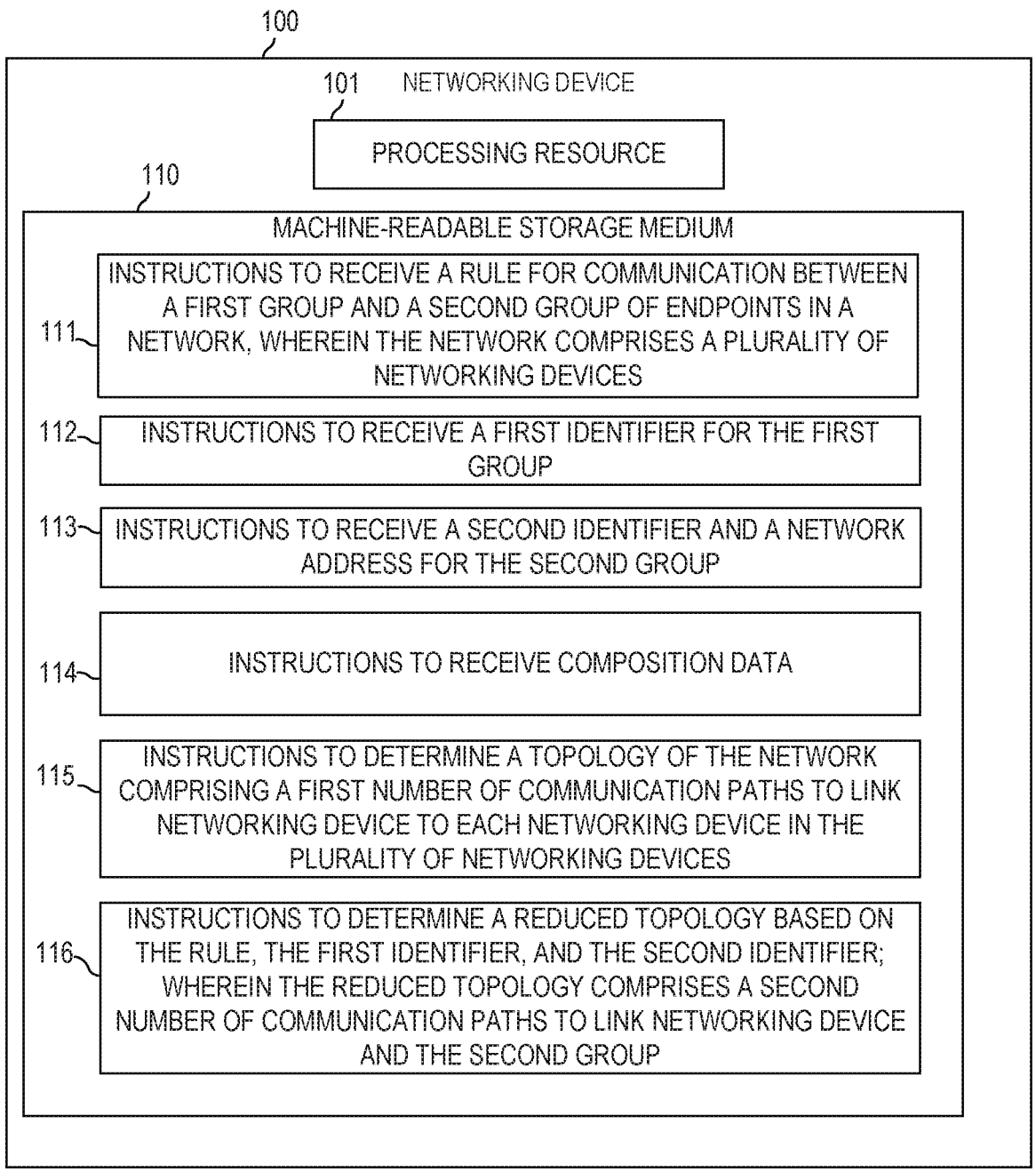
FIG. 1 is a block diagram of a networking device to determine a reduced topology of a network, according to some examples.

Communication between devices in a network may be detailed by connectivity policies set in place by the network administrator to control information access and network security.

To enforce these connectivity policies, Access Control Lists (ACLs) combined with network subdivisions may be used. However, the usage of ACLs with subdivisions couples unrelated concepts of network topology and network access control. This results in inefficient uses of resources.

For example, with mobile client devices, a change in mobile device location results in changes to network attachments and addressing. These changes need to be propagated to access control lists, resulting in inefficient use of network resources and delay. As another example, using ACLs combined with network subdivisions requires access control policies to be programmed for every network endpoint, resulting in delay and higher points of error.

Additionally, the core underlay of a network may be designed without consideration to access policies. Accordingly, the programming of forwarding paths in switches may be more than what is needed to actuate the rules set by connectivity policies. This limits the scaling of the underlay because as the size of the underlay increases, the forwarding state programmed into switches must also increase.

Examples herein address these technological problems by providing a method to limit forwarding state programmed into switches based on a reduced topology of the network. In some examples, a switch receives a group-based rule that details the allowed communication between two groups of endpoints in the network. The policy may be communicated in terms of applications running on devices attached to switches, devices attached to the switches, and/or the ports on switches themselves. For example, a rule may define that wireless access points may communicate to management controllers in the network. The groups of endpoints are associated with specific identifiers to identify the groups. The switch also receives a list of the group identifiers associated with the network and the network address (e.g., IP address) of the switches that are attached to devices associated with those identifiers. The switch receives composition data of the network and builds a topology of the network. This may be done via the Link State protocol. The switch then determines a reduced topology to connect the two groups of endpoints and programs itself based on the reduced topology. The reduced topology is based on the rule, the identifiers, and the addresses associated to the identifiers. Accordingly, examples disclosed herein allows the networking device to focus on communication paths that are consistent with connectivity policies. The reduced number of paths lead to efficient and faster network scaling and expansion.

In some examples, a computing device is provided with a non-transitory machine-readable storage medium. The non-transitory machine-readable storage medium includes instructions, that when executed, case a processing resource to receive a rule for communication between a first group and a second group of endpoints in a network. The network may comprise a plurality of networking devices. The storage medium also includes instructions, that when executed, cause the processing resource to receive a first identifier for the first group, receive a second identifier and a network address for the second group, receive composition data of the network, determine a topology of the network, and determine a reduced topology. The topology comprises a first number of communication paths to link a first networking device to each device out of the plurality of networking devices. The reduced topology comprises a second number of communication paths to link the first networking device to the second group. The reduced topology is determined based on the rule, the first identifier, and the second identifier.

In some examples, a method comprises receiving a rule for communication between a first group of endpoints and a second group of endpoints in a network. The network comprises a total number of networking devices. The first group is associated to a first number of networking devices out of the total number of networking devices and the second group is associated to a second number of networking devices out of the total number of networking devices. The method also comprises receiving the first identifier for the first group of endpoints, receiving a second identifier for the second group of endpoints, receiving composition data for the network, determining a topology of the network based on the composition, and determining a reduced topology based on the rule, the first identifier, and the second identifier. The topology comprises a first number of communication paths linking a networking device in the first number to the total number of networking devices. The reduced topology comprises a second number of communication paths linking the networking device to networking devices of the second number.

In some examples, a switch comprises a policy engine, a topology engine, and a forwarding engine. The policy engine is to receive a group-based rule for communication between a first group of endpoints and a second group of endpoints in a network. The network comprises a total number of networking devices. The topology engine is to receive a first identifier for the first group, receive a second identifier for the second group, receive composition data of the network, determine a topology of the network based on the composition data, and determine a reduced topology based on the rule, the first identifier, and the second identifier. The topology comprises a first number of paths linking the total number of devices and the reduced topology comprises a second number of paths linking the switch to the second group of endpoints. The forwarding engine is to generate a routing table based on the reduced topology.

Referring now to the figures, FIG. 1 is a block diagram of a networking device 100 to determine a reduced topology of a network. As used herein, a networking device may be a device used in a network for the transmission of packets to the network (e.g. from an outside network), from the network (e.g. to an outside network), and/or within the network (from one device in the network to another device in the network). Non-limiting examples of a networking device include a router, switch, etc. Networking device 100 may be connected to other computing devices in the network. As used herein, a "computing device" may include a server, a networking device, a chipset, a desktop computer, a workstation, a mobile phone, a tablet, an electronic reader, or any other processing device or equipment.

Networking device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, 116, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, 113, 114, 115, and 116 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to networking device 300 in FIG. 3, or switches 300A-300D in FIG. 3. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, 115, and 116 as described herein.

Instructions 111 may be executable by processing resource 101 to receive a rule for communication between a first group of endpoints and a second group of endpoints in a network. The network may comprise a plurality of networking devices. Computing devices such as mobile phones, desktop computers, controllers, etc. may be connected to the network and may be considered as being part of the network even though these types of computing devices may not be permanent or stationary in the network (e.g., a mobile phone may connect to a network and disconnect to a network).

As used herein, an endpoint in a network may represent a "conceptual unit" in a network that an administrator may abstract such that the administrator can control communication to and from that unit. In some examples, the conceptual unit may coincide with a physical device and/or virtual machine in the network. For example, an endpoint may include physical computing devices that are connected to networking devices (e.g., switches) such as personal computing devices, mobile phones, other networking devices, etc. As such, a rule involving these types of endpoints may be that personal computing devices may communicate to other personal computing devices but not to a specific type of controller. In some examples, the conceptual unit may not coincide a physical device in the network but something on the physical device. For example, an "endpoint" may include the applications hosted by the physical computing devices. An example of a rule involving these types of endpoints is that one type of application may communicate to one type of application but not another type. As yet another example, an endpoint may be a port on a networking device (e.g. a switch port). A rule involving this type of endpoint may be that a specific port of a switch may communicate with one port on another switch but not another port on the same switch. Thus, endpoints may include source locations (where the data originates), destination locations (where the data is meant to be sent), and hops along the path. Additionally, an endpoint may or may not be the last stop of a data communication (e.g. the endpoint may send the data packet to another endpoint in the network).

In some examples, an endpoint is a part of a networking device (e.g., a port on a networking device) in the network or is connected to a networking device such that communications to and from the endpoint may be routed to the endpoint via the networking device (e.g., a user computing device, a controller, etc.). As used herein, a switch or networking device that is associated to an endpoint may be the networking device that receives/transmits data packets for the endpoint and forwards it to/from the endpoint.

The endpoints may be categorized into groups, including a first group and a second group. Endpoints may be grouped together based on a similar characteristic that is shared amongst the endpoints. These include functions, method of connection to the network (e.g., wired, wireless, etc.), etc. For example, endpoints in the network that are wired controllers may be grouped into one group while endpoints that are wireless controllers may be grouped into one group. As another example, applications that are perform security functions may be grouped into one group and applications that are user interfacing applications may be grouped into one group.

The rule received may describe a communication between the first group and the second group. For example, the first group may be endpoints that are wireless access points and the second group may be endpoints that are wireless controllers. The rule may be set such that wireless access points and wireless controllers may communicate to each other. As another example, the first group may be endpoints that are wired controllers and the second group may be may be wired user computing devices. The rule may be set such that the wired controllers may communicate to the wired user computing devices. Thus, in some examples, a rule involving two groups means that communications between those two groups are allowed for the two groups. This rule may be characterized, in some examples, as a group-based policy rule. In some examples, the rule may be part of a wider communication policy set by the administrator. Thus, a policy may be comprised of at least one rule (including one rule, two rules, three rules, etc.) to define communication between endpoints in the network.

The rule may be received via a management plane of networking device 100. These rules may be set by an administrator at a management server and may be distributed and received using protocols such as Simple Network Management Protocol (SNMP), Representational State Transfer (REST), Command-Line-Interface (CLI), etc. In other examples, the rule may be distributed using a link state protocol, as described below.

The first group may be referred to by a first identifier and the second group may be referred to by a second identifier. The identifiers may be assigned to the groups and used by the network to associate to the endpoints. In some examples, identifiers are specific to their respective groups. Thus, one identifier refers to one group and not another group. Endpoints may be put into groups by a computing device in the network such as an Authentication, Authorization, and Accounting (AAA) server. For example, the AAA server may communicate with the endpoints to determine the grouping of the endpoints. In some examples, the AAA server may also assign the identifiers to the groups. In other examples, the identifiers may be assigned by the administrator of the network, Thus, the AAA may understand which endpoints belong to which groups. It may send these determinations to the networking device 100, For example, the AAA server may determine that networking device 100 is associated to endpoints grouped into the first group. The AAA server may send the first identifier to the first networking device 100, thus letting the networking device 100 know that it is associated with endpoints that are in the first group. Accordingly, instructions 112 may be executable by processing resource 101 to receive a first identifier that specifies the first group. Protocols that may be used for this include wireless protocols, including but not limited to IEEE 802.11.

Additionally, the AAA server may determine that another (second) networking device (in the plurality of networking devices) directly connected (i.e. a neighbor networking device) to networking device 100 is associated to endpoints grouped into the first group. The AAA server may send the first identifier to the other networking device. The other networking device may disseminate this information to networking device 100 and to other networking devices in the network. Along with the first identifier, the other networking device will also transmit a network address that identifies itself. The network address may identify the other networking device in the network. Examples include IP addresses, and specifically the subnet portion that identifies the networking device.

The identifier and the network address are sent in a manner that ties the network address to the identifier so that networking device 100 understands that the other networking device is also associated to the first group. Protocols that may be used to disseminate and receive this information include routing protocols for IP networks, including but not limited to link state protocols such as Open Shortest Path First (OSPF), For example, the other networking device may send a packet (e.g., Link State Advertisement) to networking device 100. The packet may identify the other networking device as the neighbor of networking device 100 and comprise the first identifier and the network address (e.g., IP address) of the other networking device. In some examples using OSPF, the first identifier may be stored in an OSPF Opaque LSA option field. Accordingly, instructions 112 may be executable by processing resource 101 to receive the first identifier and a network address for the other networking device.

The AAA server may determine that a third networking device (in the plurality of networking devices) is associated with endpoints that are grouped in the second group. Accordingly, the AAA server will transmit the second identifier to the third networking device. In some examples, the third networking device is a neighbor of networking device 100. The third networking device may send its network address and the second identifier to networking device 100. This lets networking device 100 know that the third networking device is associated to endpoints grouped in the second group. Protocols that may be used to disseminate and receive this information include routing protocols for IP networks, including but not limited to link state protocols such as Open Shortest Path First (OSPF). For example, the third networking device may send a packet (Link State Advertisement) to networking device 100. Accordingly, instructions 113 may be executable by processing resource 101 to receive the second identifier and a network address for the second group.

In some examples, the second identifier and a network address for the second group may be sent in the same packet as the first identifier and network address for the first group. For example, instead of being neighbors with networking device 100, third networking device may be neighbors with the other (second) networking device, discussed above. Thus, the third networking device may send a packet to second networking device comprising third networking device's network address and the second identifier. Second networking device, who is a neighbor to networking device 100, may send its information and the information it received from the third networking device in its packet to networking device 100.

Thus, in some examples, networking device 100 may receive the first identifier and a network address for the first group in one packet and the second identifier and a network address for the second group in a different packet. However, in other examples, networking device 100 may receive the first identifier, a network address for the first group, the second identifier, and a network address for the second group in the same packet.

Additionally, in some examples, networking device 100 may receive multiple network addresses for the first identifier. For example, a fourth networking device (in the plurality of networking devices) may be associated with an endpoint that is grouped in the first group. The fourth networking device may be a neighbor of networking device 100 and will send a packet to the networking device 100 with the first identifier and its network address. Similarly, in some examples, networking device 100 may receive multiple network addresses for the second identifier.

In some examples, storage medium 110 includes instructions that are executable by processing resource 101 to transmit identifiers and network addresses for groups to neighbor networking devices. For example, networking device 100 may be told by AAA server that it has endpoints that are grouped in the first identifier. Accordingly, networking device 100 may transmit the first identifier along with its network address to a neighbor networking device such that the neighbor networking device knows that networking device 100 is associated with the first group. Networking device 100 may also transmit information associated with one set of neighbors to another set of neighbors. The first set and second set of neighbors are connected to networking device 100 but are not neighbors of each other. This may be characterized as cascading the information, allowing information to flow from neighbors to non-neighbors of the networking device that originally sent the information. This cascading of information from neighboring networking devices to neighboring networking devices allows networking device 100 to understand which endpoints are associated to which networking device for each networking device in the network.

Instructions 114 are executable by processing resource 101 to receive composition data of the network. As used herein, composition data includes data that allows networking device 100 to learn the existence of networking devices in the network and the connections between the networking devices. One connection between networking device 100 and a first neighbor networking device may be slower than another connection between networking device 100 and a second neighbor networking device. Accordingly, networking device 100 may use this information to implement the routing of data packets.

For example, a networking device that is a neighbor to networking device 100 may send a packet to networking device 100. The packet may comprise information (e.g., its network address, etc.) that identifies the neighbor networking device to networking device 100 and additional information that may be dictated by the specific routing protocol being used. For example, in OSPF, the packet may include a link cost in communicating a packet to the neighbor networking device. The link cost, in some examples, may be determined by the bit rate of the interface between the two neighbor networking devices.

Thus, composition data may include information of neighboring networking devices of networking device 100. Composition data may also include information regarding networking devices that are not neighbors of networking device 100. This is because, in some examples, information from non-neighbors may be cascaded to networking device 100 through its neighbors. Because of this, networking device 100 may receive information regarding all networking devices in the network via its neighbors. Accordingly, networking device 100 understands the composition of the network and the costs associated with communication between neighboring networking devices in the network. Storage medium 110 may also include instructions to store the composition data in a database on networking device 100. In some examples, this database may be characterized as a link state database.

In some examples, storage medium 110 may also include instructions that are executable by processing resource 101 to send composition data to its neighbors. For example, networking device 100 may send its network address and link cost to its neighbors.

Instructions 115 may be executable by processing resource 101 to determine a topology of the network. The topology may be based on the composition data (as discussed above in relation to instructions 114). The topology may comprise a number of communication paths to link networking devices in the plurality of networking devices. As used herein, "a number" may include one path, two paths, three paths, etc. Based on the composition data received, networking device 100 understands the cost of all paths to all reachable destinations in the network. Networking device 100 may use this information to determine the best path from itself to reachable destinations in the network. As used herein, "best" may be a path that meets a certain criteria. For example, a path from networking device 100 to another networking device may be considered a best path because it is the path with the least intermediate networking devices (i.e. the path with the smallest number of hops). As another example, a path may be considered the best path because it spans the least physical distance. In some example, a combination of characteristics may be considered. In some examples, the best path may be determined using an algorithm (e.g., Dijkstra algorithm in OSPF, etc.). Thus, in FIG. 1, networking device 100 may determine the best path to the reachable networking devices in the network to which it is connected. For example, there may be two possible paths to a second networking device. Networking device 100 may determine that the best path is the first path. The first path is considered to be one of the communication paths in the topology. Accordingly, as used herein, the first number of communication paths include the best paths from networking device 100 to each reachable networking device in the network.

The topology includes the possible best paths that may be used by a hardware component of networking device 100 to forward a data packet. For example, a communication path may indicate that the next hop in the path is a specific networking device. From there, networking device 100 understands which interface to send a specific data packet to. Thus, the first number of communication paths may be used to program the hardware component of networking device 100 such that networking device 100 may send packets to each reachable destination in the network. However, the first number of communication paths, while representing data paths as allowed by the underlay of network, may not represent data paths as allowed by the communication policies set for the network. For example, a communication path may allow a data packet to go from networking device 100 to a second networking device, but a communication policy may not have use for that communication path.

Thus, programming (e.g., generate routing tables) for every path of the first number of communication paths may be an inefficient use of networking device 100's resources.

Instructions 116 may be executable by processing resource 101 to determine a reduced topology. The reduced topology may be based on the rule, the first identifier, and the second identifier. In some examples, it is also based on network addresses received by the networking device 100. For example, from the rule, networking device 100 understands that endpoints in the first group are allowed to communicate with endpoints in the second group. From the first identifier, networking device 100 understands that it is associated to at least one endpoint in the first group. Accordingly, networking device 100 understands that it may forward a data packet form itself to other networking devices that are associated to endpoints in the second group. From the second identifier and the network addresses for the second group, networking device 100 understands what networking devices in the network are associated to endpoints in the second group. Accordingly, networking device 100 may choose (from the first number of communication paths) the communication paths that allow it to communication to those networking devices (i.e. the networking devices associated to endpoints in the second group), These paths make up the reduced topology and may be characterized as a second number of communication paths. Accordingly, the second number of communication paths may include paths that link networking device 100 to the second group of endpoints. In some examples, the second number of communication paths is smaller than the first number of communication paths. In some examples, the second number of communication paths is the same as the first number of communication paths. Accordingly, the reduced topology allows networking device 100 to concentrate on communication paths that are allowed by the rule.

In some examples, storage medium 110 may include instructions executable by processing resource 101 to generate a routing table for the second number of communication paths. These routing tables may be used by a hardware component of networking device 100 (not shown in FIG. 1) to forward data packets.

Figure 2:
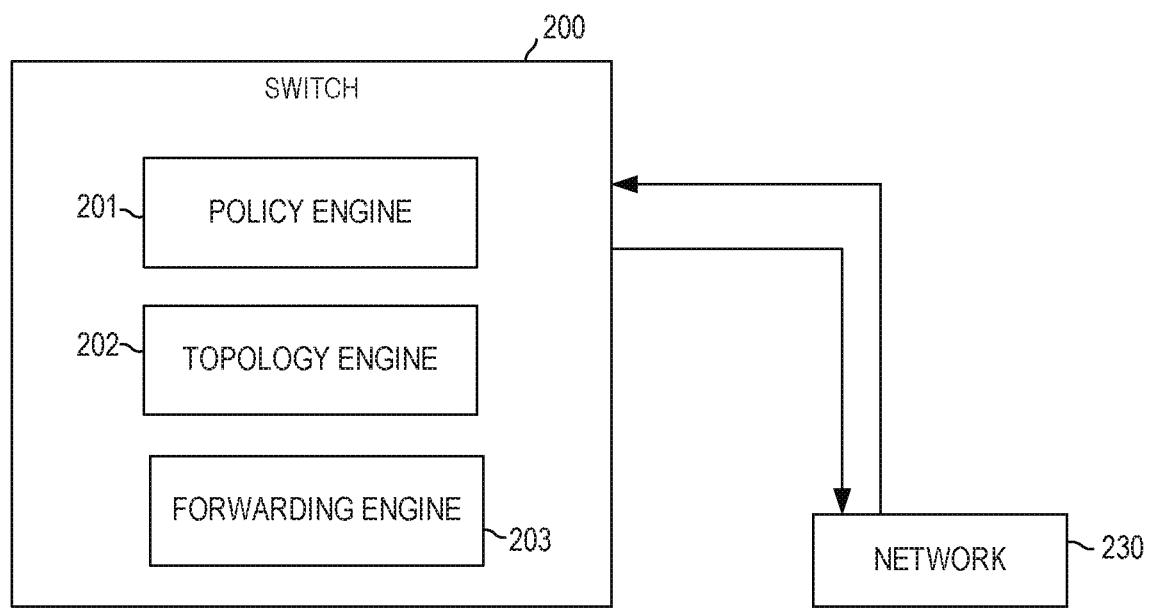
FIG. 2 is block diagram of a networking device with a forwarding engine to generate forwarding tables based on a reduced network topology, according to some examples.

Networking device 100, which is described in terms of instructions and processing resource, may include aspects of switch 200 of FIG. 2 or switches 300A-300E of FIG. 3. For example, storage medium 110 may include instructions executable by processing resource 101 to validate a received packet based on a source address and the rule, as discussed in relation to FIGS. 3A-3D. Additionally, storage medium 110 may include instructions executable by processing resource 101 to validate a received packet based on a source identifier and the rule, as discussed in relation to FIGS. 3A-3D.

FIG. 2 shows a block diagram of a switch 200 connected to network 230. Switch 200 comprises a policy engine 201, a topology engine 202, and a forwarding engine 203. Network 230 may comprise other networking devices.

Each of engines 201, 202, 203, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines.

Each engine of switch 200 can include at least one machine-readable storage mediums (for example, more than one) and at least one computer processor (for example, more than one). For example, software that provides the functionality of engines on networking device can be stored on a memory of the switch 200 to be executed by a processor of the switch 200.

Policy engine 201 includes a combination of hardware and software what allows networking device 200 to receive a group-based rule for communication between a first group of endpoints and a second group of endpoints in network 230. As used herein, a group-based rule defines communication between groups of endpoints, rather than individual endpoints. At least one endpoint (including only one endpoint) may fall into a group due to how the group is defined. Network 230 comprises a total number of networking devices (e.g., switches, routers, etc.).

Policy engine 201 may communicate with a management server via a management plane to receive the group-based rule. For example, the policy engine 201 may implement protocols such as CLI, MLB, REST, etc. to receive this communication. The rule is for communication between two groups of endpoints that may be characterized as a first group of endpoints and a second group of endpoints.

The first group of endpoints may be associated to a first group of networking devices in network 230 and the second group of endpoints may be associated to a second group of networking devices in network 230.

In the example shown in FIG. 2, switch 200 may be associated to an endpoint that is grouped in group 1. For example, switch 200 may be connected to a computing device that runs an application that meets the criteria for group 1. As another example, switch 200 may have a port that meets the criteria for group 1. As yet another example, switch 200 may be connected to a computing device that meets the criteria for group 1.

While switch 200 may know that is associated to a specific endpoint, it may not know which group the specific endpoint is in. Topology engine 202 includes a combination of hardware and software that allows switch 200 to receive a first identifier for the first group, allowing switch 200 to understand that specific endpoint it is associated to is grouped in the first group. In some examples, this identifier may come from an AAA server in the network 200 using IEEE protocol. For example, the AAA server may communicate with a specific endpoint associated to switch 200 to determine that the specific endpoint is grouped in the first group. Accordingly, the AAA server may send the first identifier to switch 200. Accordingly, from this communication, switch 200 knows that it is associated to an endpoint that is grouped in the first group.

Topology engine 202 may also receive network addresses of other networking devices that are associated with the first group. For example, a neighbor switch of switch 200 may also be associated with an endpoint that is grouped in the first group. The neighbor switch may transmit this information in a packet to topology engine 202. The packet may be a packet that includes a network address of the neighbor switch and the first identifier to identify that the neighbor switch is associated to an endpoint in the first group. Accordingly, topology engine 202 may also implement link state protocols such as OSPF for the receiving and processing of these packets.

Topology engine 202 may also allow switch 200 to receive a second identifier for the second group. For example, a neighbor switch of switch 200 may also be associated with an endpoint that is grouped in the second group. The neighbor switch may transmit this information in a packet to topology engine 202. The packet may include a network address of the neighbor switch and the second identifier to identify that the neighbor switch is associated to an endpoint in the first group. These types of packets may be sent via a link state protocol such as but not limited to OSPF.

In some examples, topology engine 202 allows switch 200 to receive information from other switches in the network such that switch 200 knows which switches are associated to which endpoints. For example, switch 2 (not shown in FIG. 2) may send switch 200 its network address and the identifiers for the groups (e.g., first identifier, second identifier, etc.) with which it is associated to. Switch 2 may also send switch 200 information that it receives from its neighbor switches. These neighbor switches may not be directly connected (neighbor) to switch 200. In this manner, switch 200 may understand the picture of which networking devices in network 230 are associated to which group of endpoints.

Topology engine 202 may also allow switch 200 to receive composition data of the network that represents the total number of networking devices. The composition data may be sent in multiple packets from multiple networking devices in network 230. This data may allow switch 200 to learn about the existence of the networking devices in the network and the connections between the networking devices. For example, a neighbor switch of switch 200 may send a packet to switch 200 to identify itself with its network address. The packet may also include a cost of sending data to the neighbor switch. The neighbor switch may also include in its packet data regarding switches that are its neighbors but are not neighbors of switch 200. In this cascading manner, switch 200 may receive composition data for each networking device out of the total number of networking devices in network 230 such that switch 200 understands the makeup of the network.

Topology engine 202 may determine a topology of network 230 based on the composition data. The topology engine comprises a number of paths to link switch 200 to each device out of the total number of networking devices. In some examples, there may be more than one path that leads to the same destination. Topology engine 202 may allow switch 200 to determine the "best" (i.e. "preferred") path based on specific criteria, as discussed above in relation to FIG. 1. In some examples, the topology of the network comprises the best paths and not all possible paths (e.g., the topology does not include multiple paths leading to redundant destinations). The topology determined based on the composition data, however, may include at least one path from switch 200 to every networking device out of the total of networking devices.

As discussed above, such a topology may not be reflective of paths that adhere to the group-based rule received by policy engine 201. For example, a communication path in the first number of communication paths may allow switch 200 to communicate to another switch that is associated to a wired controller. Switch 200 itself may be associated to a wireless user-interfacing application. The group-based rule, however, does not involve communication between wireless user-interfacing application and wired controllers. Thus, the rule does not allow communication between those two types of endpoints. Accordingly, that path (between switch 200 and the other switch) may not be used during operation of the network 230 because it does not reflect the group-based rule.

Thus, topology engine 202 may determine a reduced topology. The reduced topology may be based on the group-based rule (received by policy engine 201), the first identifier, and the second identifier. The reduced topology may also be based on network addresses received by topology engine 202 that allow switch 200 to know which networking devices are associated to what type of endpoints in network 230. The reduced topology may comprise a second number of communication paths. The second number of communication paths may link switch 200 to networking devices in network 230 that are associated with endpoints in group 2. Accordingly, the second number of communication paths allow switch 200 to forward packets that adhere to the group-based rule. In some examples, the reduced topology is a portion of the topology of the network (e.g., the reduced topology is a small part of a larger topology of the network). Accordingly, in some examples, the second number of communication paths is smaller than the first number of communication paths.

Forwarding engine 203 includes a combination of hardware and software that allows switch 200 to generate a routing table based on the reduced topology. This may be characterized as programming a hardware component (e.g., an Application Specific Integrated Circuit (ASIC)) of switch 200 with tables that it can use to look up paths. The tables that are generated reflect the second number of communication paths and allow switch 200 to forward data packets that adhere to the group-based policy.

While FIG. 2 is described in relation to one group-based rule, a "first" group of endpoints, and a "second" group of endpoints, examples described herein are not limited to the number described. For example, switch 200 may receive multiple group-based rules (i.e. wherein the rules combined together may be characterized as a group-based policy) that relate to multiple group of endpoints.

Figure 5:
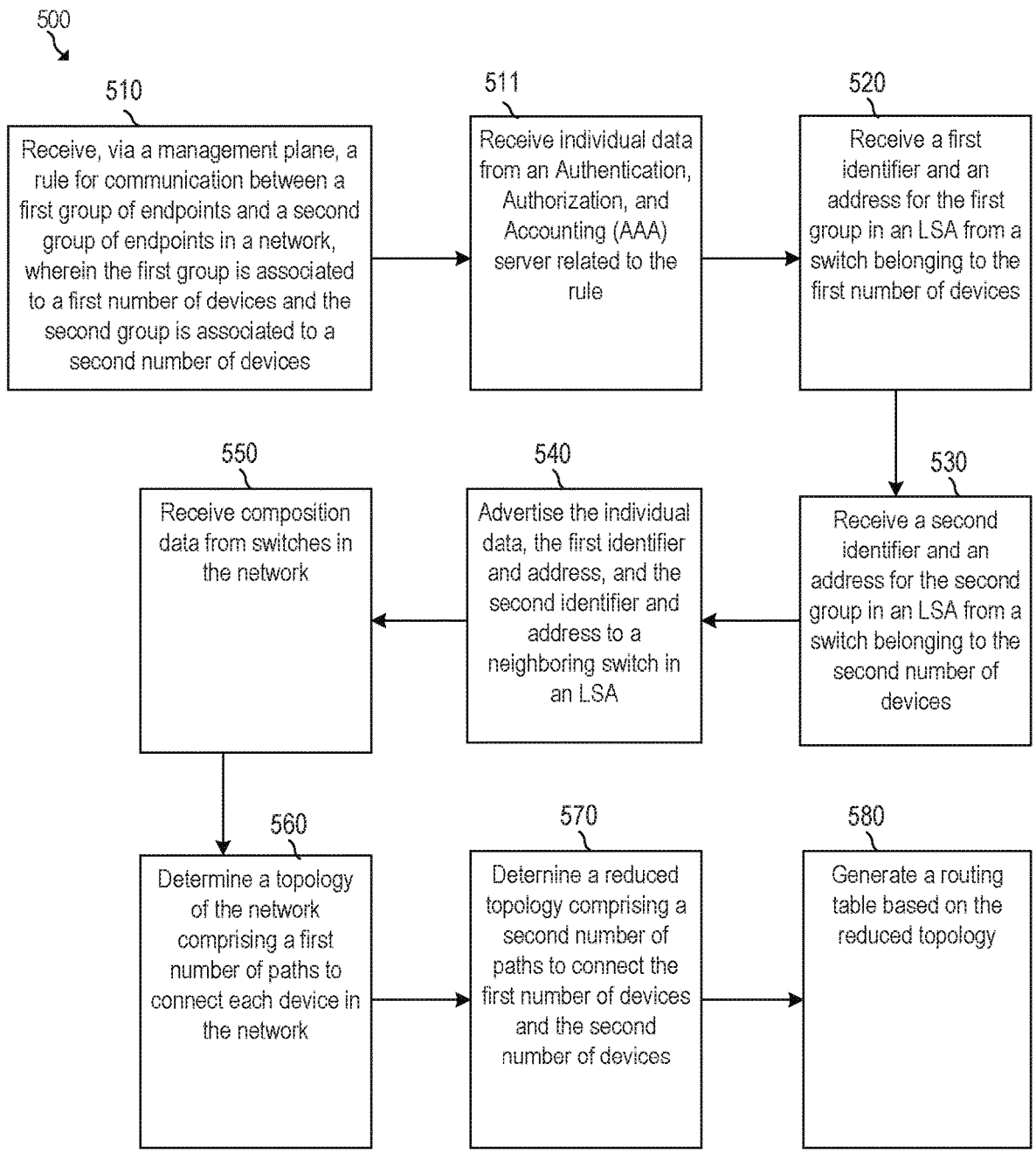
FIG. 5 is a block diagram of a flowchart to generate a reduced topology of a network using a management server and an AAA server, according to some examples.

Switch 200, which is described in terms of engines comprising hardware and software, may include aspects of networking device 100 of FIG. 1 or switches 500 of FIG. 5. For example, forwarding engine may allow switch 200 to validate a received packet based on a source address and the rule, as discussed in relation to FIGS. 3A-3D. In other examples, forwarding engine may validate a received packet based on a source identifier and the rule, as discussed in relation to FIGS. 3A-3D.

Figure 3A:
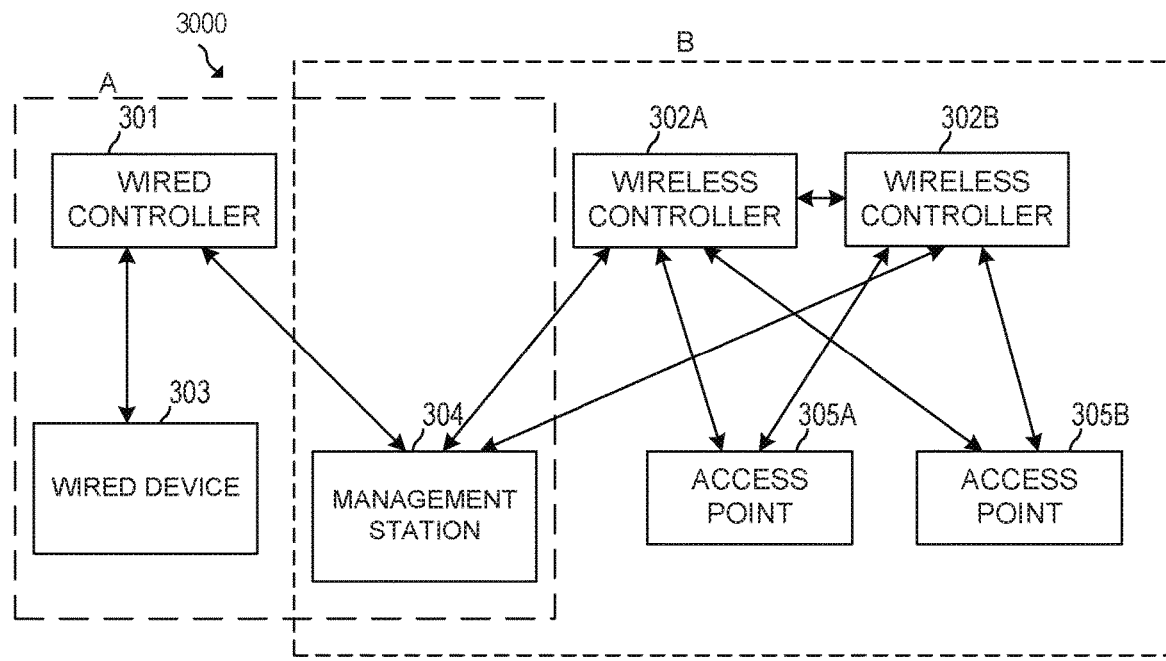
FIG. 3A is a block diagram of endpoints in a network, according to some examples.
Figure 3B:
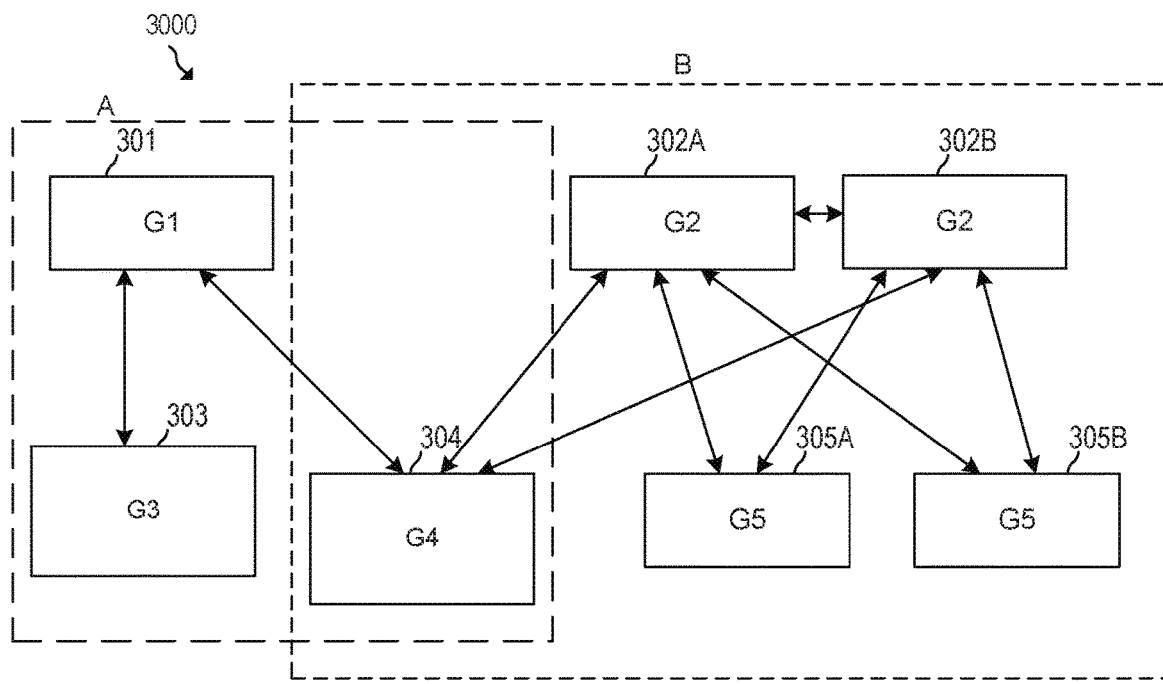
FIG. 3B is a block diagram of the grouping of the endpoints of FIG. 3A into groups according to a group policy, according to some examples.
Figure 3C:
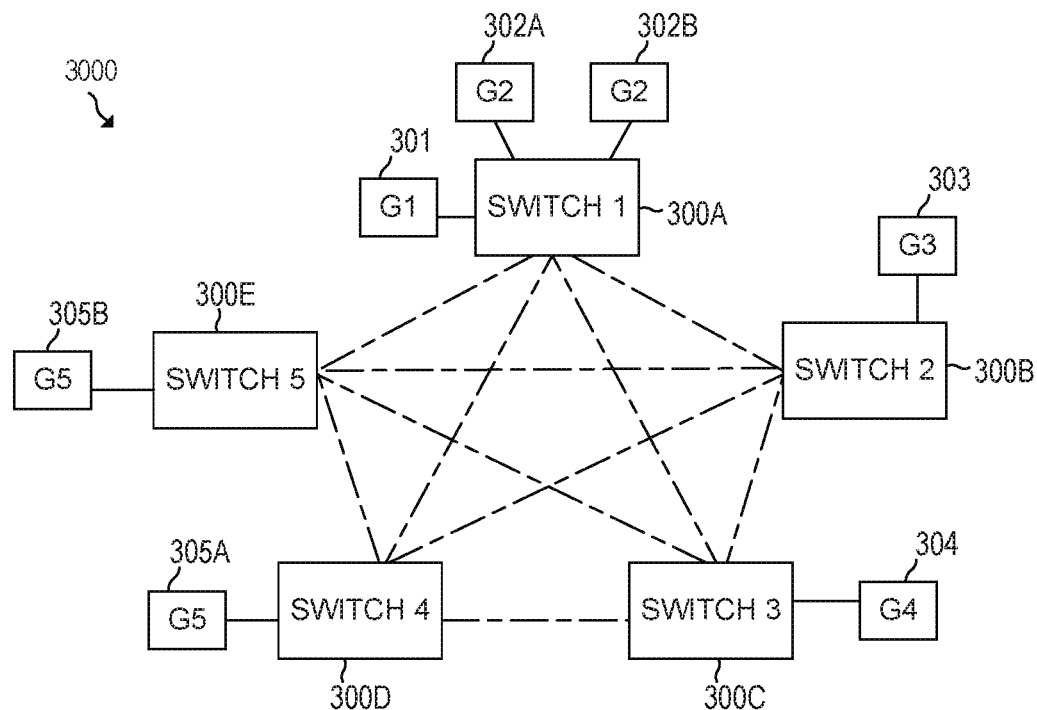
FIG. 3C is block diagram of the topology of the network in FIG. 3A, according to some examples.
Figure 3D:
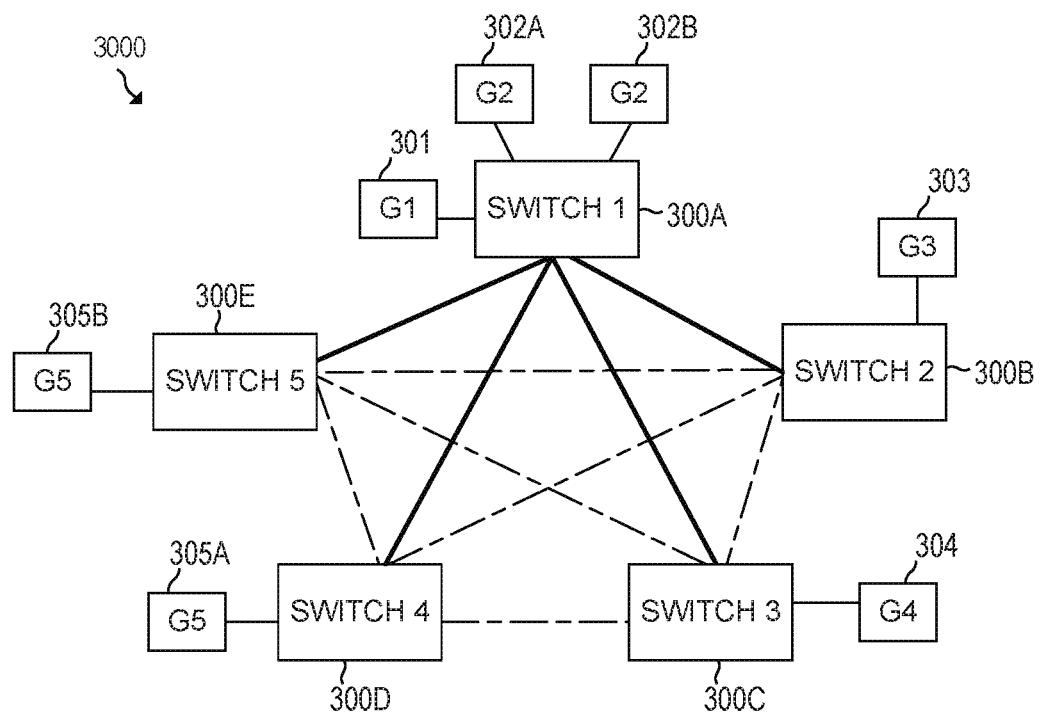
FIG. 3D is a block diagram of the reduced topology of the network in FIG. 3A, according to some examples.

FIGS. 3A-3D show block diagrams of a network 3000. FIG. 3A shows the endpoints of network 3000. FIG. 3B shows the grouping of the endpoints. FIGS. 3C-3D shows the switches associated to the endpoints.

As seen in FIG. 3A, network 3000 may comprise endpoints 301, 302A, 302B, 303, 304, 305A, and 305B. These endpoints may be associated to networking devices such as switches which are not shown in FIG. 3A, The double-arrowed lines connecting the different endpoints show the policies that are implemented by an administrator of network 3000, For example, in network 3000 communication between wired controller 301 and wired device 303 may be needed for the functions of network 3000, Similarly, communication between wireless controller 302A and access points 305A and 305B may be needed for the functions of network 3000. As noted in FIG. 3A, network 3000 may be conceptually divided into two sets that may communicate to each other. Set A includes wired controller 301, wired device 303, and management station 304, Set B includes wireless controller 302A, wireless controller 302B, access point 305A, access point 305B, and management station 304.

An administrator may define rules that allow communication similar to the double-arrows in FIG. 3A. Instead of defining communication rules individually (per endpoint), these endpoints may be grouped into groups based on their similarities and the rules may be defined based on the groups. For example, the wired controller 301 may be grouped into a first group (G1), the wireless controllers 302A and 302B may be grouped in a second group (G2), the wired device may be grouped in a third group (G3), the management station may be grouped in a fourth group (G4), and the access points 305A and 305B may be grouped in a fifth group (G5).

FIG. 3B shows the endpoints as members of their groups. In the example shown in FIGS. 3A and 3B, there are a two hierarchal "layers" of groups. Groups G1 and G2 may be considered root groups and groups G3, G4, and G5 may be considered leaf groups. A root group may be a group whose members may transfer traffic to other roots (members in their own hierarchal "layer" of groups) and leaf groups, A leaf group may be a group whose members may transfer traffic to roots but not to other members in their own hierarchal "layer" of groups. While network 3000 has two layers, in other examples, it may have less or additional layers. For example, network 3000 may have only one layer comprising all of root groups. In another example, network 3000 may have three layers, with two root groups on top and a leaf group at the lowest level. Accordingly, examples disclosed herein may be applicable to networks with one layers, two layers, three layers, etc.

A group-based policy may be defined by an administrator of network 3000 that includes a group-based rule for each group. In some examples, the group-based rule may be represented via a chart, shown in table 1.

TABLE 1

|  | R-G1 | R-G2 | R-G3 | R-G4 | R-G5 |
|---|---|---|---|---|---|
| T-G1 | — | — | A | A | — |
| T-G2 | — | B | — | B | B |
| T-G3 | A | — | — | — | — |
| T-G4 | A | B | — | — | — |
| T-G5 | — | B | — | — | — |

The columns in Table 1 represent the group members as receivers of a packet (e.g., R-G1 represents G1 as a receiver). The rows in Table 1 represent the group members as transmitters of a packet (e.g., T-G1 represents G1 as a transmitter). Table 1 is a different way of visualizing the communication between the different groups of network 3000 and communicates the same information as the arrows connecting the different groups in FIGS. 3A and 3B do. For example, looking at Table 1, as a transmitter, an endpoint in G1 (T-G1) may communicate to endpoints in groups G3 (R-G3) and G4 (R-G4). This communication is part of the communication in set A. Looking at FIG. 3B, there is an arrow (part of a double-sided arrow) that goes from G1 to G3 and an arrow (part of a double-sided arrow) that goes from G1 to G4. Transversely, as transmitters, endpoints in G3 (T-G3) and G4 (T-G4) may both send packets to G1 (R-G1), This communication is part of the communication in set A. Looking at FIG. 3B, there is an arrow (part of a double-sided arrow) that goes from G3 to G1 and an arrow (part of a double-sided arrow) that goes from G4 to G1.

FIGS. 3C and 3D show network 3000 with endpoints and associated switches to the endpoints. Switch 1, switch 2, switch 3, switch 4, and switch 5 may each implement the instructions as described above in relation to FIG. 1, and/or the engines as described above in relation to FIG. 2. Accordingly, each switch in FIGS. 3C and 3D may receive information about the composition of network 3000, may receive information regarding other switches and their associated endpoints, and may receive information regarding the group-based policy (as described above in relation to FIG. 3A, FIG. 3B, and Table 1). Accordingly, each switch may determine the best path from itself to every other switch in network 3000. FIG. 3C is a representation of a topology of network 3000. The dotted lines between switch 1 (300A), switch 2 (300B), switch 3 (3000), switch 4 (300D), and switch 5 (300E) represent the "best" path from each switch to every other switch in network 3000. While the dotted lines show a direct path connecting each switch to every other switch, the physical path may or may not be direct and may include a number of hops, etc.

The topology of FIG. 3C includes a best path from every switch to every other switch. For example, switch 4 has a best path to switch 5, a best path to switch 1, a best path to switch 2, and a best path to switch 3. However, these best paths may not be used when implementing the group-based policies as described above in relation to FIGS. 3A and 3B. For example, switch 4 is associated to an endpoint in G5. Switch 3 is associated to an endpoint in G4. Accordingly, the path from switch 4 to switch 3 may allow the endpoint belonging to G5 to communicate to the endpoint belonging to G4. However, Table 1 does not show communication between G4 and G5. Thus, the topology of FIG. 3C may be determined but may not be programmed into the switches of network 3000. For example, switch 4 may not program into its hardware all the paths shown connecting it to every switch.

Instead, switches 1, 2, 3, 4, and 5 may each determine a reduced topology. All of the reduced topologies are represented in FIG. 3D such that FIG. 3D represents a reduced topology of the network. The reduced topologies may be based on the rules (of the group-based policy), the identifiers, and the network addresses received by each switch, as discussed above in relation to FIGS. 1 and 2. Accordingly, each switch may determine a second number of paths that connect it to switches associated to endpoints for which its associated endpoints are allowed to communicate to. For example, switch 4 is associated to an endpoint grouped in G5. The group-based policy includes a rule that allows communication from G5 endpoints to G2 endpoints. Accordingly, switch 4 determines that the path from itself to switch 1 will be utilized to deliver packets to and from switch 1 (e.g., from endpoint 302A grouped in G2 to endpoint 305A grouped in G5). Accordingly, it determines that the path to be part of the reduced topology as that path fits the rules set in the group-defined policy. Switch 4 determines that the paths to/from switch 5, to/from switch 2, to/from switch 3 are not part of the reduced topology because those paths would not be allowed by the group-based policy. The reduced topology is singled out using bold lines while the rest of the topology are in dotted lines. Similarly, switch 1 determines that the path from itself to switch 4 will be utilized to deliver packets to and from switch 4. Accordingly, it determines that the path to be part of the reduced topology as that path fits the rules set in the group-defined policy.

The group-based policy includes a rule that allows communication from G2 endpoints to G4 endpoints. Accordingly, switch 3 determines that the path from itself to switch 1 will be utilized to deliver packets to and from switch 3. Similarly, switch 1 determines that the path from itself to switch 3 will be utilized to deliver packets to and from switch 1. Those paths are part of the reduced topology determined by each of the switches.

In some examples, switches 1, 2, 3, 4, and 5 may each program its hardware component(s) such that the reduced topology may be implemented by the hardware components. For example, routing tables may be generated in each switch so that the hardware component may forward data packets based on the reduced topology.

In some examples, the paths in the reduced topology may also allow for potential of packets being sent that are not compliant with group-based policy. Accordingly, in some examples, filtering mechanisms may be used for additional filtering to validate that the packets are compliant with the communication rule(s). As used herein, validating a packet may include determining that the sender and the receiver of the packet are allowed to communicate to one another based on the rule. A packet that is not validated (i.e., invalid) is not processed.

For example, each switch may implement a white list filtering mechanism based on at least one rule in the group-based policy, and a source network address in a received packet. For example, switch 2 has received the rule in the group-based policy, knows the groups involved in the rule, and understands the network addresses involved in the rule. Accordingly, when switch 2 receives a data packet from a source switch, it may validate the packet based on the source network address and the rule. For example, in the examples of FIGS. 3A-3D, endpoints grouped in G4 may communicate to endpoints grouped in G4. Switch 3 is associated with an endpoint grouped in G4. Switch 3 understands that is associated with an endpoint grouped in G4. Based on the rule, it understands that there should be a path to switches associated to endpoints grouped in G2. Based on the network addresses and group identifiers it receives from other switches in network 3000, switch 3 understands that switch 1 is associated to endpoints grouped in G2. Accordingly, switch 3 may determine the source network address of the source switch in the data packet and filter (e.g., drop) any packet that does not equal the network address of switch 1 (as switch 1 is the only switch in network 3000 that is associated to G2 endpoints). The source network address may include the network address of the switch from which the packet originated.

Similarly, switch 3 may also filter packets that it sends out. Because switch 3 is associated to a G4 endpoint and a G4 endpoint communicates with a G2 endpoints and nothing else, switch 3 understands that it should send packets to switch 1 and no other switch (as switch 1 is the only switch in network 3000 that is associated to G2 endpoints). Thus, it may determine the destination network address of the destination switch in the packet and filter (e.g., not forward) any packet that does not equal the network address of switch 1. The destination network address may include the network address of the switch which will directly send the packet to the endpoint. The destination network address may be characterized as the destination address.

White list validation may be implemented by instructions encoded on a non-transitory storage medium that are executable by a processing resource (such as described in FIG. 1). White list validation may also be implemented by engines, such as described in FIG. 2.

In some situations, the use of white-list filtering may generate a large amount of filtering tables. In these situations, validating of the packet may be based on the group identifier in addition to or instead of a white list. In these examples, the packet that is transmitted may include a field for the group identifier for the source endpoint (the endpoint from which the packet originated). This identifier may be characterized as a source identifier. Thus, a packet that is destined for an endpoint grouped in G1 will have a tag in the packet that identifies G1. The tag will be the identifier that is assigned to that group. The switch that receives the packet may determine the group identifier in the packet and filter (e.g., drop) packets that do not match the group-based policy. For example, in the examples of FIGS. 3A-3D, switch 1 may receive packets meant for endpoints in group G1 and endpoints in group G2. Based on a determination that it has received a packet for an endpoint in group G5, it may filter the packet and determine that the packet is invalid.

Validating based on group identifier may be implemented by instructions encoded on a non-transitory storage medium that are executable by a processing resource (such as described in FIG. 1). Validating based on source identifier may also be implemented by engines, such as forwarding engine described in FIG. 2.

Figure 4:
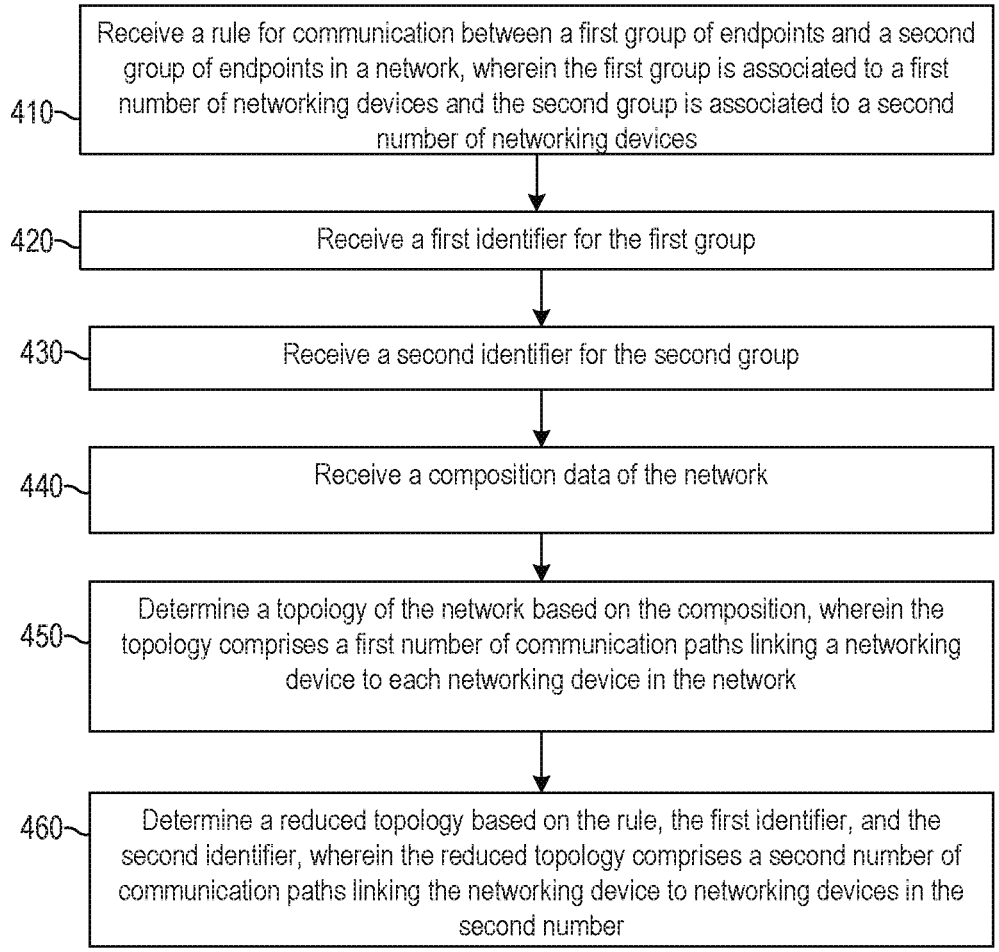
FIG. 4 is a block diagram of a flowchart of determining a reduced topology of a network, according to some examples.

FIG. 4 illustrates a flowchart for method 400 to determine a reduced topology of a network. Although execution of method 400 is described below with reference to networking device 100, other suitable devices for execution of method 400 may be used (e.g., switch 200 of FIG. 2, switches 300 of FIGS. 3A-3D, etc.)

At 410, instructions 111 cause processing resource 101 of networking device 100 to receive a rule for communication between a first group of endpoints and a second group of endpoints in a network. The first group is associated to a first number of networking devices in the network and the second group is associated to a second number of networking devices in the network. The network may comprise a total number of networking devices. The first number of networking devices may be a part of the total number of networking devices. The second number of networking devices may be a part of the total number of networking devices. Additionally, a networking device may be considered both a part of the first number and a part of the second number. For example, a switch may be associated to two endpoints, each grouped into different groups. Thus, the switch may be considered as being part of the first number of networking devices and part of the second number of networking devices. In some examples, the rule may be sent via a management plane of networking device 100.

At 420, instructions 112 cause processing resource 101 to receive a first identifier for the first group. This identifier may be unique to the group of endpoints and identify the endpoints to the network. In some examples, the first identifier may come from a different computing device in the network, such as an AAA server.

At 430, instructions 113 cause processing resource 101 to receive a second identifier for the second group. As discussed above, instructions 113 may also cause processing resource 101 to receive a network address for the second group. The network address may identify a networking device that is associated to endpoints in the second group. In some examples, the second identifier may come from other networking devices (switches) in the network. These switches may be part of the second number of networking devices.

At 440, instructions 114 cause processing resource 101 to receive composition data of the network. For example, processing resource 101 may receive packets for neighboring networking devices that identify the neighbor to networking device 100. The packet may also identity a cost of sending a packet to the neighbor.

At 450, instructions 115 cause processing resource 101 to determine a topology of the network based on the composition data. The topology may comprise a first number of communication paths linking the networking device 100 to each networking device in the network. Accordingly, the first number of communication paths may allow networking device 100 to communicate to any other reachable networking device in the network. In large networks, the first number of communication paths may be numerous and exponentially grow as the network grows.

At 460, instructions 116 cause processing resource 101 to determine a reduced topology based on the rule, the first identifier, and the second identifier. In some examples, the reduced topology may be also based on the network addresses received. The reduced topology comprises a second number of communication paths that link the networking device to networking devices in the second number. In some examples, the second number of communication paths may link the networking device to every networking device in the second number of networking devices. Thus, this allows networking device 100 (which is associated to an endpoint in the first group) to communicate to every networking device that is associated to an endpoint in the second group. This allows networking device to implement and actuate the rule.

Although the flowchart of FIG. 4 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 4 may be provided in combination with functionalities described herein in relation to any of FIGS. 1, 2, 3A-3D, and 5.

FIG. 5 illustrates a flowchart for a method 500 to generate a reduced topology using a management server and an AAA server. Although execution of method 500 is described below with reference to switch 200, other suitable devices for execution of method 500 may be used (e.g., networking device of FIG. 1, switches 300 of FIGS. 3A-3D, etc.).

At 510, policy engine 201 receives a rule for communication between a first group of endpoints and a second group of endpoints in network 230. The first group is associated to a first number of networking devices in network 230 and the second group is associated to a second number of networking devices in network 230, In some examples, switch 200 may receive this from a management computing device in network 230. The management computing device may communicate to network 230 via protocols that may be used for management (e.g., CLI, REST, etc.) implemented by a management plane.

At 511, topology engine 201 receives individual data from an AAA server. The individual data may link switch 200 to the rule and thus may be characterized as being related to the rule. For example, the AAA server may determine that switch 200 is associated to an endpoint grouped in the group of endpoints described in the rule. Accordingly, the AAA server may send individual data to switch 200 that comprises the identifier that has been assigned to the first group in network 230. The individual data received lets switch 200 know which endpoints it is associated to.

At 520, topology engine 201 receives the first identifier and a network address for the first group from a switch in network 230 that belongs to the first number of networking devices. This may be sent in a link state advertisement (LSA) and the switch that sends the advertisement may be a neighbor of switch 200. Accordingly, in this advertisement, the neighbor switch lets switch 200 know its network address and that it is associated to an endpoint in the first group. The neighbor switch may understand that it is associated to an endpoint in the first group due to information from the AAA server. For example, the neighbor switch may receive its own communication from the AAA server comprising individual data for itself.

At 530, topology engine 201 receives a second identifier and a network address. The second identifier is the identifier assigned to the second group of endpoints that identifies the second group of endpoints. The network address may be one of a switch in network 230 that is associated to an endpoint grouped in the second group. For example, another neighbor switch of switch 200 (different from the neighbor switch discussed in step 520) may send its network address along with the second identifier. This may be sent in a LSA. The switch accordingly belongs to the second number of networking devices. From this advertisement, the neighbor switch lets switch 200 know its network address and that it is associated to an endpoint in the second group. The neighbor switch may understand that it is associated to an endpoint in the second group due to information from the AAA server. For example, the neighbor switch may receive its own communication from the AAA server comprising individual data for itself.

At 540, topology engine 202 may advertise the individual data it received from the AAA server (at 511), the first identifier and network address (received at 520), and the second identifier and network address (received at 530) to a neighbor switch in network 230. The advertisement may be in an LSA. The neighbor switch that receives the information may be a neighbor of switch 200 but not a neighbor of the switch discussed in 520 and not a neighbor of the switch discussed at 530. Thus, for example, switch 200 may advertise its network address tied to the first identifier. This lets the neighbor switch know that switch 200 is associated to the first group. In the same packet, switch 200 may advertise the network address of the switch discussed above in relation to 520 tied to the first identifier. This lets the neighbor switch know that that neighbor switch is associated to the first group. Additionally, in the same packet, switch 200 may advertise the network address of the switch discussed above in relation to 530 tied to the second identifier. This lets the neighbor switch know that that neighbor switch is associated to the second group. Accordingly, in this manner, switch 200 is cascading the endpoint associations from neighbors to neighbors.

At 550, topology engine 202 may receive composition data from a switch in the network. This switch may not be a member of the first number of networking devices and not a member of the second number of networking devices. Accordingly, this switch is not associated to either the first group or the second group of endpoints. The composition data may comprise the network address of the switch and the cost of sending a packet to the switch. The switch may be another neighbor of switch 200 that is not discussed in 540, 530, or 520. Topology engine 202 may also receive composition data from other switches as well (including switches that belong to the first number of networking devices and/or the second number of networking devices), This composition data may be cascaded from switches remote from switch 200 (e.g., switches not directly connected to switch 200) to neighbor switches of switch 200. The neighbor switch may send the composition data to switch 200. From the composition data, switch 200 may have information regarding each switch in network 200 (e.g., the existence of switches, the network addresses, and the cost of sending packets to/from directly connected switches).

At 560, topology engine 202 may determine a topology of the network. The topology may comprise a first number of paths to connect switch 200 to other switches in the network. In some examples, the first number of paths may include a path to each switch in the network. Each path may represent the best paths (out of a number of potential paths) to each switch.

At 570, topology engine 202 may determine a reduced topology of the network. The reduced topology may be based on the individual data received by switch 200, the identifiers received by the switch 200 that are tied to network addresses, and the rule received by switch 200. The reduced topology may comprise a second number of communication paths to connect the switch to networking devices in the second number of networking devices. In some examples, the second number of communication paths connect switch 200 to each networking device in the second number of networking devices.

At 580, forwarding engine 203 may generate a routing table based on the reduced topology. The routing table allows a hardware component of switch 200 to forward the data using paths in the reduced topology.

Although the flowchart of FIG. 5 shows a specific order of performance of certain functionalities, method 500 is not limited to that order. For example, some of the functionalities shown in succession may be performed in a different order, may be executed concurrently or with partial concurrence, or a combination thereof. For example, step 530 may be received before step 520. In some examples, functionalities described herein in relation to FIG. 5 may be provided in combination with functionalities described herein in relation to any of FIGS. 1-4, While FIG. 5 describes 520 and 530 as being separate steps received from different switches, in other examples, the same neighbor switch may send the information described in steps 520 and 530. For example, the neighbor switch may be associated with two endpoints, one endpoint may be associated to the first group and the second endpoint may be associated to the second group. Accordingly, the neighbor switch may send its network address along with the first identifier and the second identifier, From this packet, switch 200 understands that the neighbor switch is associated to both endpoints, Additionally, while FIG. 5 describes switch 200 as being associated to an endpoint in the first group, in other examples, switch 200 may be associated to endpoints in different groups. For example, switch 200 may be associated to two endpoints, one endpoint is grouped in the first group and the second endpoint is grouped in a third group. Accordingly, the individual data received in 511 may include two identifiers: one identifier for the first group and another identifier for the third group.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that when executed, cause a processing resource to perform a method, the method comprising:
   receiving a rule for communication between a first group and a second group of endpoints of a network, wherein the network comprises a plurality of networking devices, and wherein the first group of endpoints is reachable in the network via a first networking device, which includes the processing resource, of the plurality of networking devices;
   receiving a first identifier of the first group of endpoints;
   receiving a second identifier and a network address of the second group of endpoints, wherein the second group of endpoints is reachable in the network based on the network address;
   receiving composition data comprising information of the plurality of networking devices of the network;
   determining, based on the composition data, a topology of the network comprising a first set of communication paths between the first networking device and each of a rest of the plurality of networking devices; and
   reducing the topology based on the rule, the first identifier, and the second identifier, and the network address;
   wherein the reduced topology comprises a second set of communication paths between the first networking device and the second group of endpoints.

2. The non-transitory machine-readable storage medium of claim 1, wherein the method comprises:
   generating a routing table based on the reduced topology.

3. The non-transitory machine-readable storage medium of claim 1, wherein the first group of endpoints is a root group in the network, and wherein the root group is capable of transferring traffic to other root and leaf groups in the network.

4. The non-transitory machine-readable storage medium of claim 1, wherein the second group of endpoints is a leaf group in the network, and wherein the leaf group is capable of transferring traffic to a root group but not to a group in a hierarchal layer of the leaf group in the network.

5. The non-transitory machine-readable storage medium of claim 1, wherein the network address of the second group of endpoints is a network address allocated to a second networking device in the network.

6. The non-transitory machine-readable storage medium of claim 1, wherein the reduced topology further comprises a third set of communication paths between the first networking device and a third group of endpoints.

7. The non-transitory machine-readable storage medium of claim 1, wherein the method further comprises:
   receiving a packet from a source device of the plurality of networking devices, wherein the packet comprises one or more of: a source identifier identifying a source endpoint and a source address of the source device; and
   validating the packet based on the rule and one or more of: the source identifier and the source address.

8. The non-transitory machine-readable storage medium of claim 1, wherein the rule is a group-based policy rule indicated based on the first and second group of endpoints.

9. A method, executable by a first networking device in a network comprising a plurality of networking devices, for forwarding packets in the network, the method comprising:
   receiving a rule for communication between a first group of endpoints and a second group of endpoints; wherein the first group of endpoints is reachable in the network via the first networking device of the plurality of networking devices;
   receiving a first identifier of the first group of endpoints;
   receiving a second identifier and a network address of the second group of endpoints, wherein the second group of endpoints is reachable in the network based on the network address;
   receiving composition data comprising information of the plurality of networking devices of the network;
   determining a topology of the network based on the composition data, wherein the topology comprises a first set of communication paths between the first networking device and each of the rest of the plurality of networking devices; and
   reducing the topology based on the rule, the first identifier, and the second identifier, and the network address, wherein the reduced topology comprises a second set of communication paths between the first networking device and the second group of endpoints.

10. The method of claim 9, further comprising generating a routing table based on the reduced topology.

11. The method of claim 9, wherein the rule is a group-based policy rule indicated based on the first and second group of endpoints.

12. The method of claim 9, comprising:
receiving a packet from a source device of the plurality of networking devices, wherein the packet comprises one or more of: a source identifier identifying a source endpoint and a source address of the source device; and
validating the packet based on the rule and one or more of: the source identifier and the source address.

13. The method of 9, wherein the first group of endpoints is a root group in the network, and wherein the root group is capable of transferring traffic to other root and leaf groups in the network.

14. The method of claim 9, wherein the second group of endpoints is a leaf group in the network, and wherein the leaf group is capable of transferring traffic to a root group but not to a group in a hierarchal layer of the leaf group in the network.

15. A switch comprising:
a processor; and
a non-transitory computer-readable medium coupled to the processor storing instructions thereon that, when executed by the processor, cause the processor to perform a method, the method comprising:
receiving a rule for communication between a first group of endpoints and a second group of endpoints in a network, wherein the network comprises a plurality of networking devices that includes the switch, and wherein the first group of endpoints is reachable in the network via the switch;
receiving a first identifier of the first group of endpoints;
receiving a second identifier and a network address of the second group of endpoints, wherein the second group of endpoints is reachable in the network based on the network address;
receiving composition data comprising information of the plurality of networking devices of the network;
determining a topology of the network based on the composition data, wherein the topology comprises a first set of paths between the switch and each of a rest of the plurality of networking devices; and
reducing the topology based on the rule, the first identifier, and the second identifier, and the network address, wherein the reduced topology comprises a second set of paths between the switch and the second group of endpoints.

16. The switch of claim 15, wherein the method further comprises:
receiving a packet from a source device of the plurality of networking devices, wherein the packet comprises one or more of: a source identifier identifying a source endpoint and a source address of the source device; and
validating the packet based on the rule and one or more of: the source identifier and the source address.

17. The switch of 15, wherein the method further comprises generating a routing table based on the reduced topology.

18. The switch of claim 15, wherein the rule is a group-based policy rule indicated based on the first and second group of endpoints.

19. The switch of claim 15, wherein the first group of endpoints is a root group in the network, and wherein the root group is capable of transferring traffic to other root and leaf groups in the network.

20. The switch of claim 15, wherein the second group of endpoints is a leaf group in the network, and wherein the leaf group is capable of transferring traffic to a root group but not to a group in a hierarchal layer of the leaf group in the network.

* * * * *